United States Patent [19]
Hirz et al.

[11] Patent Number: 5,433,388
[45] Date of Patent: Jul. 18, 1995

[54] USAGE APPLICATION OF A MACHINE FOR RECYCLING GYPSUM PLASTER BOARD

[75] Inventors: Harri Hirz, Hauneck; Horst Sterr, Paderborn, both of Germany

[73] Assignee: Gebruder Lodige Maschinenbaugesellschaft mit, Beschrankter Haftung, Paderborn, Germany

[21] Appl. No.: 211,465
[22] PCT Filed: Oct. 1, 1992
[86] PCT No.: PCT/DE92/00848
§ 371 Date: Mar. 31, 1994
§ 102(e) Date: Mar. 31, 1994
[87] PCT Pub. No.: WO93/07101
PCT Pub. Date: Apr. 15, 1993

[30] Foreign Application Priority Data
Oct. 4, 1991 [DE] Germany .......... 41 32 906.9

[51] Int. Cl.[6] .......... B02C 23/18
[52] U.S. Cl. .......... 241/23; 241/29; 241/DIG. 38; 241/17
[58] Field of Search .......... 241/14, 16, 17, 18, 241/23, 29, 277, 65, DIG. 38

[56] References Cited

U.S. PATENT DOCUMENTS

| | | | |
|---|---|---|---|
| 3,727,846 | 4/1973 | Rader | 241/47 |
| 3,966,129 | 6/1976 | Brewer | 241/DIG. 38 X |
| 3,973,735 | 8/1976 | Ito et al. | 241/DIG. 38 X |
| 4,072,273 | 2/1978 | Reiniger | 241/24 |
| 4,801,101 | 1/1989 | Dreyer et al. | 241/243 X |
| 5,018,673 | 5/1991 | Eirich et al. | 241/62 |
| 5,183,213 | 2/1993 | Knez, Jr. | 241/DIG. 38 X |
| 5,238,193 | 8/1993 | Pearce | 241/19 |
| 5,238,195 | 8/1993 | Knez, Jr. | 241/DIG. 38 X |

FOREIGN PATENT DOCUMENTS

| | | |
|---|---|---|
| 0073864 | 3/1983 | European Pat. Off. |
| 2396941 | 2/1979 | France |
| 7820310 | 2/1979 | France |
| 2438818 | 2/1976 | Germany |
| 4021058 | 9/1991 | Germany |
| 367379 | 3/1963 | Switzerland |
| 1502166 | 2/1978 | United Kingdom |

*Primary Examiner*—Timothy V. Eley
*Attorney, Agent, or Firm*—Thomas R. Vigil

[57] ABSTRACT

Usage application of a per se known in the art continuous-operation machine for the recycling of gypsum plaster board. A coarsely pre-pulverized material is introduced into a continuous-operation machine and, within the continuous-operation machine, the waste material 20 is guided along a product-cycle in a spiral-shaped fashion through the container 4 The tools 18, 18', 18", 18"', which are arranged along an axial length on the shaft 7, rotate in a Froude number region $Fr \geq 7$ and break-up the pre-pulverized waste material 20 to a sufficient extent that a grain spectrum is produced which effectively facilitates the use of calcination devices.

11 Claims, 2 Drawing Sheets

USAGE APPLICATION OF A MACHINE FOR RECYCLING GYPSUM PLASTER BOARD

BACKGROUND OF THE INVENTION

The invention concerns a usage application of a continuous-operation machine, consisting essentially of a horizontally positioned cylindrical container having a product feed chute and a product exit chute, a driveable shaft in the container, preferentially mounted to front walls, tools mounted on the shaft, which are directed radially outward from the shaft, whereby the shaft is operated in the Froude number region $FR \geq 7$.

A continuous-operation machine of this type has become known through the brochure "Befeuchtungsmischer" (wetting-mixer) WD 12.79 SM/Rd-e 47.1500 Gebrüder Lödige Maschinenbau GmbH, Paderborn, Germany, 1979.

The known rapid continuous-operation and compact machine is designed for large through-put. It processes, as is known in the art, powdered and short-fibered material with liquid media and is utilized in the area of solid-liquid mixing. The known machine is distinguished, on the one hand, by a good mixing precision at short dwell times and large through-put capacities are possible with small machine dimensions.

The tools mounted onto the shaft rotate in a Froude number range of 7-20, whereby the Froude number is formed from the quotient of the revolution frequency n and the critical revolution frequency $n_c$.

$$Fr = \left[\frac{n}{n_c}\right]^2$$

In this revolution frequency range the product flowing into the machine is subjected to centrifugal forces by the tools which press the product against the inner wall of the container. The product passes through the machine in a product-cycle. In this fashion, the known mixing processes occur.

When manufacturing gypsum plaster board, a certain amount of unmarketable waste always occurs which consists essentially of damaged board or board which is not to specifications. The waste occurs partially directly following binding or sealing, and partially after drying of the bound boards. In the first case the waste comprises 30 to 40% moisture and in the second case the waste material is practically completely dry. The amount of waste material depends on the particular manufacturing procedure and differs; this amount lies in general between 2 and 8% of the product bulk and reaches, in extreme cases, even 10%.

In practice the re-introduction of this waste as a secondary raw material back into the production process is known in the art. Towards this end one had initially coarsely pulverized the boards. This pre-pulverized material is a mixture between gypsum chips and cardboard shreds assuming sizes up to the size of a hand on which gypsum residue is firmly bonded. With the gypsum plaster boards which are most often used having an areal weight of approximately 8 kilograms per m², the fraction of paper is between 4.5 to 5%, and with boards having an areal weight of approximately 11 kilograms per m², from 3.4 to 3.8%. A practically acceptable separation of the paper and the gypsum, for example by sorting, has, up to this point, not been successfully implemented in technical production.

The coarse pre-pulverized material cannot be processed in the conventional calcination devices. The paper shreds would, in for example an indirectly heated rotating pipe calcination device, float upon the gypsum grain bed to form balls which cannot be properly withdrawn and which, therefore, can clog the calcination device. There is also the risk that, when emptying the calcination device, dried paper remains in the calcination device which, when repowering up, causes an explosion.

One had also introduced the coarsely pre-pulverized material together with fresh natural gypsum into a mill. The up to 30 mm large natural gypsum chips effect, in advantageous cases, a certain further pulverization of the shredded paper which, however, is not always sufficient. If small grain flue-gas gypsum or chemical gypsum is utilized as a raw material a satisfactory further pulverization is not possible. The procedure has, therefore, not been practically successful.

SUMMARY OF THE INVENTION

In accordance with the invention, the known continuous-operation machine is utilized, following coarse pre-pulverization, for the processing of waste material coming from the production of gypsum plaster board.

The waste material flowing into the machine with the usage application in accordance with the invention is already pressed into a product-cycle path in the entrance region. The waste material is, by means of the tools, processed in a spirally running product motion in the product-cycle in a surprisingly more uniform and more effective fashion than achieved in the mills utilized up to this point and, at the same time, is thereby homogenized.

By processed it is meant that the paper shreds are ground down to as small an extent as possible and that the remaining waste material is reduced to primary grain size to as great an extent as possible. At the product exit, the processed material manifests a grain spectrum which is particularly well suited for further processing in known calcination devices. The efficiency and the operational reliability of the subsequent processing steps is, in this fashion, significantly increased. Furthermore, the materials processed in accordance with the inventive usage application are also particularly well suited for mixing with fine raw gypsum.

With the inventive usage application it is also possible for fluids to be brought into the product cycle. This is particularly advantageous when the degree of moisture desired for the processing operation has not yet been achieved and/or when a particular granularity or agglomerate formation is necessary.

In addition, a return region comprising spatially fixed baffle walls and/or baffle rods, which are also useful for adding fluids, can be established in the processing volume which, together with the rotating tools, can effect an additional shearing of the product.

In accordance with the inventive usage application, the mean dwell time of the waste material in the container is very short. That is to say, a mean dwell time of 15 seconds to 150 seconds is sufficient to break-up the plate-sized coarse pulverized pieces of gypsum plaster board to a sufficient extent that individual particle sizes are achieved, which can be further processed without difficulty in a direct or indirectly heated calcination device.

If, in accordance with particular manufacturing conditions, it not be possible to achieve the desired grain size spectrum in one machine at the output of the machine, an additional machine can be positioned in series in accordance with the inventive usage application; in this machine, if required, additional dried material can also be mixed in while further breaking-up processing is carried out.

If the waste material to be processed is too moist, it is possible for the shaft and/or the tools to be heated. If, frictional heat must, in addition, be removed from the machine, it is also possible to cool the shafts or the tools. In the utilized machines, the tools are screwed into shafts so that the free end of the tools, by screwing to a greater or lesser extent into the tool shaft, can be separated to a greater or lesser extent from the inner wall of the container in a simple fashion.

It is furthermore advantageous to so configure the cylindrical container that it consists of two half shells which are pivotable with respect to each other. This allows a simple access and the tools, according to the requirements, can be rapidly exchanged.

As can be derived from German patent application P 41 24 984.4, the machine in accordance with the inventive usage application can also be combined with a plough-blade mixer which, on the one hand, provides additional breaking-up action and, on the other hand, homogeneously mixes the materials to be processed by the procedure so that they can subsequently be introduced into a calcination device without any difficulty.

It is also particularly advantageous when the pre-pulverization of the defective gypsum plaster board is already untertaken in the entrance region of the machine. With this configuration of differently functioning mechanisms, it is possible to achieve compact assembly units.

With the machine in accordance with the inventive usage application, it is also possible, in contrast to the teaching in accordance with P 41 24 984.4, to satisfactorally carry out the reprocessing of defective gypsum plaster board without using cutter heads.

Further advantages can be derived from the description and the accompanying drawing. Likewise the above-mentioned features as well as those which will be additionally explained below in accordance with the invention can each be utilized individually or collectively in arbitrary combinations. The embodiments mentioned are not to be taken as exclusive enumeration but rather have exemplary character only.

BRIEF DESCRIPTION OF THE DRAWINGS

The invention is represented in the drawing and will be further explained in the embodiments.

Figure 1:
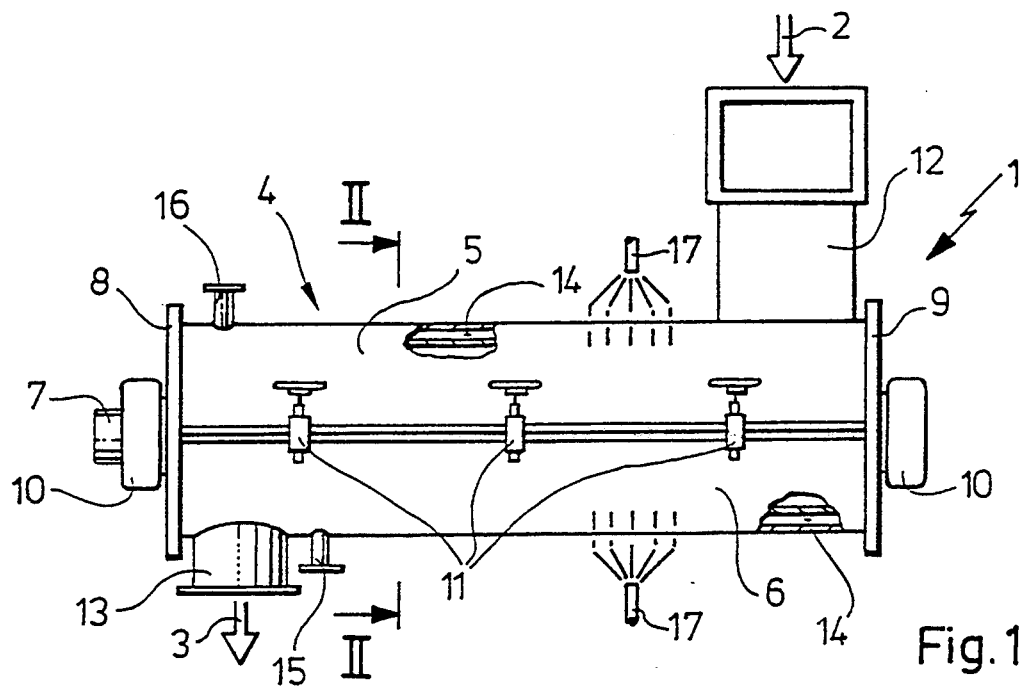
FIG. 1 shows an overall view of a machine in the inventive usage application.

The individual figures of the drawing show the machines utilized in accordance with the inventive usage application in a partially strongly schematized fashion and are not to be taken to scale.

DESCRIPTION OF THE PREFERRED EMBODIMENT

In FIG. 1, 1 is an overall view of a machine utilized in accordance with the inventive usage application. Arrow 2 indicates the product flow as it passes through machine 1. Arrow 3 is the product flow for the homogeneously broken-up waste material of the gypsum plaster board when flowing out of the machine 1 in the processed state. The waste material passes through a container 4 along a spiral-shaped path. The product to be processed is passed through machine 1 in a product-cycle and is pressed tightly onto the inner wall of the container. The container 4 consists of a first half-shell 5 and a second half-shell 6. The half-shells 5, 6 are connected to each other in such a fashion that they can be pivoted with respect to each other. Container 4 has a shaft 7 which is preferentially mounted via front walls 8, 9. In the FIG. 7 indicates the shaft and 10 indicates the bearing. The shaft 7 itself is driveable; the driving mechanisms suitable therefor are not shown in FIG. 1. Hand-screws 11 are provided for on the first and second half-shells 5, 6 by means of which the half-shells 5, 6 can be held together in a product-tight fashion. A product feed chute 12 is configured on the first half-shell 5 and a product exit chute 13 is provided for on the second half-shell 6. In the figure, the container 4 is provided with a jacket 14 by means of which the container 4 can be heated or cooled. Media such as water vapor, gases of various kinds and oil are suitable for heating or cooling. A directed temperature adjustment can be used to control deposit formation within container 4. In the figure, feed connectors 15 and exit connectors 16 are represented for the media. By means of mountings 17 it is possible to introduce fluids into the product-cycle. The mountings 17, in particular pipes, can also function as baffle-rods to define a return zone. The pipes can exhibit cross sections of arbitrary polygonal shape. In the return zone, the material being processed can be subjected to additional shearing forces. Semicircular shaped plate-segment baffle walls can replace the baffle rods.

Pulverizing instruments with individual drive mechanisms can be provided for in the product feed chute 12 which can undertake a coarse pulverization of the waste material.

Figure 2:
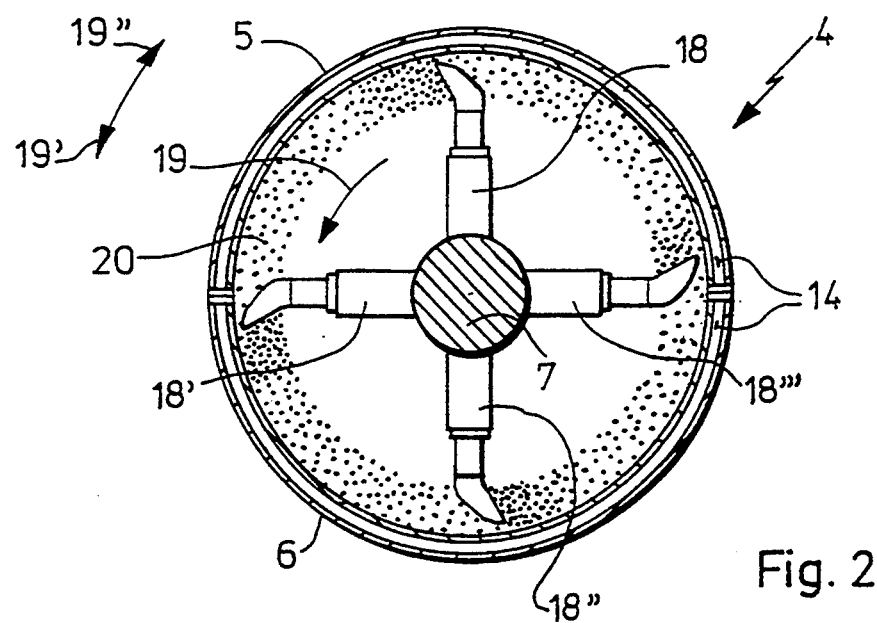
FIG. 2 shows a cut in accordance with II—II of FIG. 1.

FIG. 2 shows the cut II—II of FIG. 1. Further features of the machine which are still visible in the background of the cut II—II such as hand screws 11, mountings 17 and the product feed chute 12 are not represented in the figure for reasons of clarity. The same objects are given the same reference symbols in the figures.

The sectional cut shows the shaft 7 with mounted tools 18, 18', 18" and 18'''. The tools 18, 18', 18", and 18''' consist of a shaft, into which the free cone-shaped ends of these tools are screwed. By means of the screw, it is possible to easily adjust the separation of the free ends of the tools 18, 18', 18", 18''' relative to the inner wall of the vessel. The shaft 7 rotates in the direction of the arrow 19 along with tools 18, 18', 18" and 18'''.

Due to the rotational speed of the tools 18, 18', 18" and 18''', the waste material 20 is guided through the vessel 4 in a spiral-shaped fashion in the product-cycle. The product is thereby processed to such an extent that a grain spectrum is achieved whose grain size allows for its use in the above mentioned calcination devices, without difficulty. The waste material 20 is indicated by dots in FIG. 2.

The half shells 5, 6 exhibit a jacket 14 by means of which the container 4 can be heated or cooled. The shaft 7, represented in FIG. 2 as a solid shaft, can also be configured as a hollow shaft by means of which heating or cooling media can be introduced to the tools 18, 18', 18" and 18'''. The tools 18, 18', 18" and 18''' are distributed in the axial direction along the entire shaft 7. The first half-shell 5 is pivotable with respect to the spacially fixed second half-shell 6. Arrows 19' and 19" indicate the pivot direction. The pivot bearing on the one side of the container 4, the closing mechanism on the other side, and the hand screws 11, are not shown in the figure.

Figure 3:
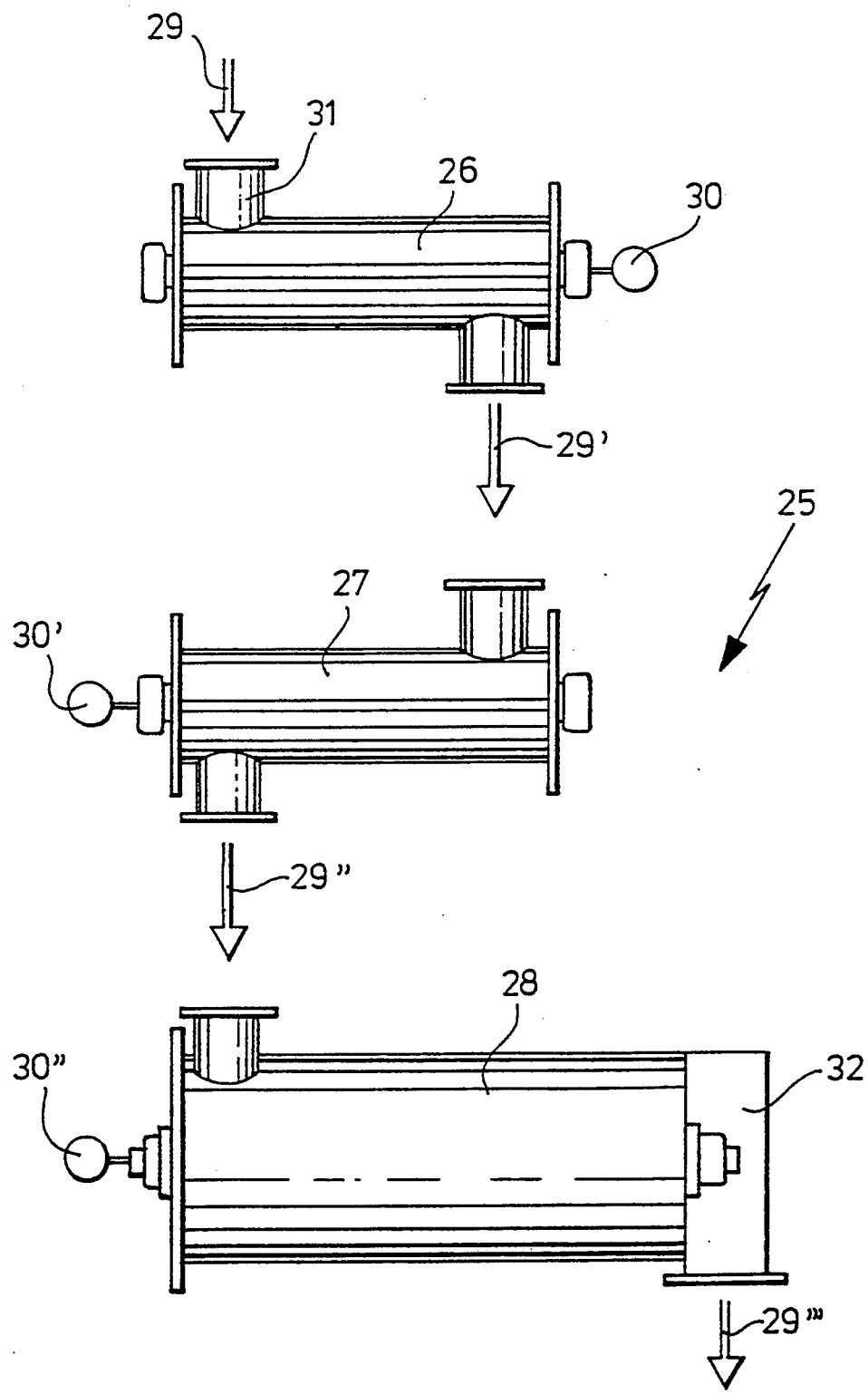
FIG. 3 shows an embodiment of a configuration having a plurality of machines which can be utilized in the usage application in accordance with the invention.

FIG. 3 shows a machine configuration 25, by way of example, as it can be utilized in the inventive usage application. A first machine 26, described in accordance with the inventive usage application, and a second machine 27 are connected in series with a plough-blade mixer 28 which is per se known in the art. The waste material to be processed flows in the direction of arrows 29, 29', 29", 29''' through the machine configuration 25. The individual machines 26, 27 and the plough-blade mixer 28 are driven by symbolically represented drive mechanisms 30, 30', 30". Additional pulverizing tools can be provided for in the product feed chute 31 which are not shown in the figure and the processed waste material is fed into a calcination device, which is per se known in the art, via product exit chute 32. The machine configuration 25 shown in the figure can also have additional machines attached thereto according to need.

Usage application of a per se known in the art continuous-operation machine for the recycling of gypsum plaster board. A coarsely pre-pulverized material is introduced into a continuous-operation machine and, within the continuous-operation machine, the waste material 20 is guided along a product-cycle in a spiral-shaped fashion through the container 4 The tools 18, 18', 18", 18''', which are arranged along an axial length on the shaft 7, rotate in a Froude number region $Fr \geq 7$ and break-up the pre-pulverized waste material 20 to a sufficient extent that a grain spectrum is produced which effectively facilitates the use of calcination devices.

We claim:

1. A method for the continuous-operation of a machine to recycle gypsum plaster board waste material comprising the steps of:
   coarsely pre-pulverizing the waste material;
   feeding the coarsely pre-pulverized waste material into a feed chute of a horizontally positioned, cylindrical container having an exit chute;
   driving a shaft in the container in a Froude number range $Fr \geq 7$;
   grinding the waste material with tools which are radially mounted on the shaft; and
   introducing the waste material into a further processing device to recycle the waste material.

2. The method of claim 1, wherein a mean dwell time of the waste material in the container assumes a value between 15 to 150 seconds.

3. The method of claim 1, further comprising at least one of heating and cooling at least one of the shaft and the tools.

4. The method of claim 1, further comprising accessing the inside of the cylindrical container by pivoting two half-shells which form the container.

5. The method of claim 1, further comprising:
   pulverizing and homogenizing the waste material in a first machine; and
   mixing the homogenized, pulverized waste material with additional bulk material in a second machine.

6. The method of claim 1, further comprising feeding the processed waste material from the container into a continuous-operation mixer for further processing.

7. The method of claim 1, wherein the further processing device comprises an indirectly or directly heatable calcination device.

8. The method of claim 1, wherein the course pre-pulverization takes place in the vicinity of a product feed chute.

9. The method of claim 1, further comprising feeding fluids through container mountings into the container.

10. A method for the continuous-operation of a machine to recycle gypsum plaster board waste material comprising the steps of:
    coarsely pre-pulverizing the waste material;
    feeding the coarsely pre-pulverized waste material into a feed chute of a horizontally positioned, cylindrical container having an exit chute;
    driving a shaft in the container in a Froude number range $Fr \geq 7$;
    grinding the waste material with tools which are radially mounted on the shaft to press the waste material against an inner wall of the cylindrical container, to pass the waste material along a spiral path from the feed chute to the exit chute, and to homogenize the waste material;
    discharging the waste material through the exit chute; and
    introducing the waste material into a further processing device to recycle the waste material.

11. A method for the continuous-operating of a machine to recycle gypsum plaster board waste material comprising the steps of:
    coarsely pre-pulverizing the waste material;
    feeding the coarsely pre-pulverized waste material into a feed chute of a horizontally positioned, cylindrical container having an exit chute;
    driving a shaft in the container in a Froude number range $Fr \geq 7$;
    grinding the waste material with tools which are radially mounted on the shaft to press the waste material against an inner wall of the cylindrical container, to pass the waste material along a spiral path from the feed chute to the exit chute, and to homogenize the waste material;
    discharging the waste material through the exit chute; and
    introducing the waste material into an indirectly or directly heatable calcination device to recycle the waste material.

* * * * *

UNITED STATES PATENT AND TRADEMARK OFFICE
CERTIFICATE OF CORRECTION

PATENT NO. : 5,433,388
DATED : July 18, 1995
INVENTOR(S) : Harri Hirz, et. al.

It is certified that error appears in the above-indentified patent and that said Letters Patent is hereby corrected as shown below:

Title page, item [73], Assignee: should read--

Gebruder Lodige
Maschinenbaugesellschaft mit,
Beschrankter Haftung, Paderborn,
Germany Babcock-BSH Aktiengesellschaft
Vormals Buttner-Schilde-Haas AG
Parkstrasse 29
D-47829 Krefeld,
Germany--

Signed and Sealed this

Seventh Day of May, 1996

Attest:

BRUCE LEHMAN

Attesting Officer

Commissioner of Patents and Trademarks